(12) United States Patent
Johnson et al.

(10) Patent No.: US 7,730,322 B2
(45) Date of Patent: Jun. 1, 2010

(54) SYSTEM AND METHOD OF FOILING BUFFER-OVERFLOW AND ALIEN-CODE ATTACKS

(75) Inventors: Harold J. Johnson, Nepean (CA); Stanley T. Chow, Nepean (CA); Alexander Main, Dunrobin (CA)

(73) Assignee: Cloakware Corporation, Ottawa (CA)

(*) Notice: Subject to any disclaimer, the term of this patent is extended or adjusted under 35 U.S.C. 154(b) by 888 days.

(21) Appl. No.: 10/367,648

(22) Filed: Feb. 14, 2003

(65) Prior Publication Data
US 2003/0172293 A1    Sep. 11, 2003

(30) Foreign Application Priority Data
Feb. 14, 2002   (CA)   ................................... 2372034

(51) Int. Cl.
*G06F 9/00*    (2006.01)
*G06F 12/14*    (2006.01)
(52) U.S. Cl. ........................................ 713/189; 380/264
(58) Field of Classification Search ............... 726/2, 726/22, 23, 24, 25, 26
See application file for complete search history.

(56) References Cited

U.S. PATENT DOCUMENTS

| | | | | |
|---|---|---|---|---|
| 4,278,837 A * | 7/1981 | Best | | 713/190 |
| 4,319,079 A * | 3/1982 | Best | | 713/190 |
| 4,465,901 A * | 8/1984 | Best | | 713/190 |
| 5,949,973 A * | 9/1999 | Yarom | | 726/23 |
| 6,088,452 A * | 7/2000 | Johnson et al. | | 380/28 |
| 6,301,699 B1 * | 10/2001 | Hollander et al. | | 717/131 |
| 6,385,727 B1 * | 5/2002 | Cassagnol et al. | | 713/193 |
| 6,412,071 B1 * | 6/2002 | Hollander et al. | | 726/23 |
| 6,438,666 B2 * | 8/2002 | Cassagnol et al. | | 711/163 |
| 6,519,702 B1 * | 2/2003 | Williams | | 726/23 |
| 6,578,094 B1 * | 6/2003 | Moudgill | | 710/57 |
| 6,647,400 B1 * | 11/2003 | Moran | | 707/205 |
| 6,651,171 B1 * | 11/2003 | England et al. | | 713/193 |
| 6,826,697 B1 * | 11/2004 | Moran | | 726/23 |
| 6,889,209 B1 * | 5/2005 | Rabin et al. | | 705/57 |
| 6,941,473 B2 * | 9/2005 | Etoh et al. | | 726/5 |
| 6,993,663 B1 * | 1/2006 | Paya et al. | | 711/163 |
| 7,036,020 B2 * | 4/2006 | Thibadeau | | 713/193 |
| 7,251,735 B2 * | 7/2007 | Howard | | 713/189 |
| 7,278,161 B2 * | 10/2007 | Lingafelt et al. | | 726/23 |

(Continued)

OTHER PUBLICATIONS

US 5,748,741, 05/1998, Johnson et al. (withdrawn)*

*Primary Examiner*—Matthew B Smithers
*Assistant Examiner*—Jeffery Williams
(74) *Attorney, Agent, or Firm*—Jeffrey M. Measures; Borden Ladner Gervais LLP (57) ABSTRACT

The present invention relates generally to computer software, and more specifically, to a system and method of foiling buffer-overflow and alien-code attacks. The invention protects computers from such attacks by encoding data placed in storage, and varying the encodings used in different storage areas. When the data is needed by a software application, the data is simply decoded in a complementary manner. This prevents storage areas written according to one usage from being used effectively for some other purpose. The method of the invention can be done in a number of ways. For example, a "protector" engine can be placed between a software application and memory, or the function calls in the software application itself, could be amended to include encoding and decoding. Other embodiments and alternatives are also described.

14 Claims, 3 Drawing Sheets

U.S. PATENT DOCUMENTS

| | | | |
|---|---|---|---|
| 7,281,268 B2 * | 10/2007 | Hollander et al. | 726/22 |
| 2002/0144141 A1 * | 10/2002 | Edwards et al. | 713/200 |
| 2003/0065929 A1 * | 4/2003 | Milliken | 713/189 |
| 2003/0182572 A1 * | 9/2003 | Cowan et al. | 713/200 |
| 2004/0030912 A1 * | 2/2004 | Merkle et al. | 713/200 |

\* cited by examiner

SYSTEM AND METHOD OF FOILING BUFFER-OVERFLOW AND ALIEN-CODE ATTACKS

FIELD OF THE INVENTION

The present invention relates generally to computer software, and more specifically, to a system and method of foiling buffer-overflow and alien-code attacks.

BACKGROUND TO THE INVENTION

Despite the deployment of various kinds of defenses, worm programs, viruses, and other kinds of remote attacks over the Internet continue to cause damage, disrupt traffic, and otherwise hobble computer- and communications-based productivity.

An exploit is a form of attack, often embodied in a software entity such as a virus or worm program, which makes use of a system vulnerability in order to perform some action not intended by the system's designers. A cracker is a system-savvy person who employs the knowledge in hostile ways to the detriment of the system's intended use. Malware is a general term referring to any kind of software entity—directly executable, executable by an interpreter, or non-executable—whose purpose is to harm or to obtain unauthorized access to a computer system, typically with no human intervention in its operation. Malware includes, but is certainly not limited to, computer viruses and worm programs.

'Remote-control' attacks performed over the Internet, either by viruses, worm programs, and other 'canned' exploits of system flaws, or the use of such flaws in a remote attack by a cracker, have become very serious problems for computer systems connected to the Internet. There are many kinds of defenses ranging from identifying malware or other remote attacks and preventing their completion, to profiling expected behaviour, and then (once unexpected behaviour is detected) limiting the damage by shutting down part or all of the system, to 'sand-box' approaches in which imported software runs in a limited sub-environment, to rule-based approaches based on military security systems.

Despite the use of firewalls, virus-detection software, and all of these other defensive measures, such remote attacks continue to cause great damage.

A high proportion of the high-risk vulnerabilities reported concern buffer overflows. Buffer overflow vulnerabilities result from a failure to limit input lengths, so that input can overwrite memory used for other purposes. For example, the ICAT ranking of top ten vulnerabilities, as of Jan. 18, 2002, includes three buffer-overflow problems, of which two concern Microsoft's Internet Information Services (IIS) (TM) used for web-hosting, and one concerns the mapper from Simple Network Management Protocol (SNMP) to Distributed Management Interface (DMI) for Solaris (TM), widely used for servers. These vulnerabilities concern areas where substantial volumes of commercial Internet traffic could be compromised.

In the open-source world, of the top ten security alerts listed at the Debian home page (www.debian.org), as of Jan. 18, 2002, three also concerned buffer overflow vulnerabilities. Debian is a project providing an open-source GNU/Linux distribution.

Not only are buffer overflows a wide-spread and persistent problem, they also represent extremely serious risk, because an attack can use such a vulnerability to run arbitrary code with the privileges of the attacked application. Since many applications run with very high levels of privilege (using such facilities as the setuid or setgid directory flags of Unix (TM) or GNU/Linux), an exploit's code can often do practically arbitrary damage, and can obtain any information available on the attacked system.

The kinds of defenses which have been deployed previously against buffer overflow attacks are conditioned by the sources of such vulnerabilities, which are:
1. system data-input facilities which do not specify a limit on length;
2. systems implementation languages such as C and C++, which do not mandate array bounds checking (nor require that array bounds be declared), or which use character strings or other data terminated by a sentinel value (e.g., for C or C++, the null character), rather than by a separate count; and
3. absence of hardware protection against overwriting of code, or against execution of data (as in Intel's IA-32, where the memory-protection hardware does not distinguish readable data from executable code); or failure of a system or application to employ such hardware protections when available.

There are compilers for C and C++ which enforce array-bounds checks. Such checks eliminate many of the array vulnerabilities, but not all: C and C++ do not require arrays to have declared bounds, and idiomatic C or C++ code often uses a varying pointer rather than an array and an index. A fully dynamic approach, provides almost complete coverage if the library has been completely converted to this form (which, depending on the library, might be a large project in itself), but even then, there are idiomatic C usages (such as zero-length, unsized, or unit-length arrays at the ends of allocated structures to allow for flexible arrays) which are hard to cover fully in this way. Moreover, the performance penalty for the use of full bounds checking is sufficient to forbid general deployment, except as a debugging technique. Such checking results in an increase of between 75% and 200% overhead in code size and execution time. Although C++ permits the definition of arrays with checked bounds, the ISO-standard C++ library contains a vector<> template for which the default indexing (operator[]) implementation does not check the bounds. Thus, unless programmers use the ISO standard library with full cognizance of this hazard, it will virtually guarantee an ongoing supply of buffer-overflow flaws to exploit.

Other kinds of protections include the use of canaries: special data values placed at strategic points in memory and checked for integrity. The difficulty is that it cannot be guaranteed that any use of canaries light enough to permit good performance will also capture attacks against which they have not been tested. That is, canaries have a coverage problem: only parts of the data are protected. Canaries, by their very nature, provide 'spot' checks.

The bottom line is that dynamic checking in compilers and memory management facilities can only provide partial coverage, or nearly full coverage with such high performance penalties that the protection is relegated to the status of a debugging tool. Moreover, when such defenses are deployed, their vulnerabilities (any points which they do not cover) may become known all too quickly.

Cohen and Forrest, Somayaji, and Ackley have proposed an approach which might be called defense by diversity, the premise being that widely deployed versions of software are easy to attack because all of their instances are exactly alike. Many attacks are 'canned'. That is, they are performed entirely by software entities created in advance by an experienced attacker, rather than requiring ongoing human participation in the attack during the execution of an exploit. The exception is unwitting participation (Trojan horse malware), as in the "I LOVE YOU" e-mail worm exploiting Microsoft Outlook™ where opening an attachment executes the exploit. Since many attacks are canned, or are otherwise performed remotely and with limited access (at least until the attack has succeeded), the attack depends on a priori knowledge of how the attacked system works: no extensive investigation can be performed during an attack when a surprise is encountered, because either the malware cannot be made sufficiently intelligent, or the cracker does not yet have sufficient access privileges to allow such an investigation. If the a priori expectations of the attack's creator or performer can be falsified by diversifying instances of the system, the attack will fail.

Cohen proposes a version of the diversity defense in which application software is modified periodically (i.e., in which the diversity is created through time: yesterday's program differs from today's). To implement Cohen's proposal, the system to be protected must be augmented with software which modifies the system on an ongoing basis.

Forrest et al. consider diversity in which changes are not successive, but start with the same root software which is then modified in a random fashion (e.g., during compilation). As a result, diversity according to Forrest et al. might be termed spatial diversity: different system creation instances use differing random input, so that different installations, distributed in space, contain diverse systems.

Whether the diversity is through time as proposed by Cohen, or through space as suggested by Forrest et al., the kinds of diversity which they have proposed are not ideally directed to the specific problems of defending against remote attacks in general and buffer overflows in particular.

For example, Forrest et al. propose incrementing stack frame size for routines at compile time, in random increments of 16 bytes, from no increments up to four increments. They found that this did indeed defend against a particular exploit. Suppose, however, that such a defense were used against overwriting the routine's return address, and thus branching to code provided by the exploit. A cracker could simply ensure that her exploit's code entry point is written at each of the five possible offsets of the return address, thereby rendering the proposed defense useless. As with canaries, this approach has a coverage problem.

SUMMARY OF THE INVENTION

It is therefore an object of the invention to provide a novel system and method of foiling buffer-overflow and alien-code attacks, which obviates or mitigates at least one of the disadvantages of the prior art.

The invention deploys a new kind of diversity-based defense, called the Babel defense, against one of the most problematic kinds of attack: buffer-overflow attacks. After considering various alternatives, including other kinds of diversity-based defenses, and why they are relatively ineffective, we explain how the new kind of defense shuts down buffer overflow attacks effectively, and also provides strong protection against hostile executable code from external sources.

The new defense is not dependent on historical information, and therefore is highly effective even against brand-new attacks. It even provides an effective defense against insider-initiated attacks.

One aspect of the invention is broadly defined as a method of computer program protection comprising the steps of: encoding data placed in storage, varying the encodings between different storage areas, preventing storage areas written according to one usage from being used effectively for some other purpose; and storing the encodings with association to their respective storage areas, so that the encoded data may be decoded when required.

Another aspect of the invention is defined as a method of modifying a computer program to make it resistant to attack, the method comprising the steps of: identifying function calls which read or write data to or from memory; generating a corresponding new set of function calls which encods and/or decode data which is read or written, to or from memory; replacing the function calls in the computer program with the new set of function calls.

A further aspect of the invention is defined as a method of modifying a computer program to render it resistant to attack, the method comprising the steps of: identifying transfers of data to and/or from a memory; adding encoding steps prior to any steps which write to the memory; and adding decoding steps after any calls which read from the memory.

An additional aspect of the invention is a method of computer protection comprising the steps of: encoding application data stored to memory; storing the application data encodings, so that the encoded data may be decoded when required; and not encoding system data stored to memory; whereby buffer overflows from application data memory to system data memory will cause improper operation of the computer as the overflowed data will not be interpreted correctly.

BRIEF DESCRIPTION OF THE DRAWINGS

These and other features of the invention will become more apparent from the following description in which reference is made to the appended drawings in which.

DETAILED DESCRIPTION OF THE EMBODIMENTS

The concept of the invention is to disable fraud by means of communication diversity. An attempt to perpetrate a fraud generally depends on fraudulent communication. If, by diversifying data representations used in communication, we can render fraudulent communications effectively meaningless, we can prevent the effect which any such fraud was intended to achieve.

Software may be diversified using software obfuscation techniques, which inject some degree of randomness into implementations. However, obfuscation is aimed at confusing an onsite human attacker, rather than foiling a 'canned' or otherwise remote attack: protecting a piece of software against a hostile environment is quite different from protecting an environment against hostile remote accesses or hostile pieces of software.

Tamper-resistant software (TRS) technology may be used to achieve diversity. Malware operates by tampering with the system; generally by fraudulent invocations or the presentation of fraudulent information. Tamper-resistance to such fraudulent invocations and presentations is desirable.

TRS techniques may be deployed, specialized and fine-tuned for spatially-diversified protection against buffer overflow attacks, and protection against alien executable code. As will be described below, this approach can thwart buffer overflow attacks. It also ensures that effective restrictions can be placed on alien executables to prevent them from harming the system.

Many suitable TRS encoding techniques exist which might be used to effect the invention, including those described in the following:
1. David Aucsmith and Gary Graunke. Tamper-resistant methods and apparatus. U.S. Pat. No. 5,892,899;
2. Stanley Chow, Harold Johnson, and Yuan Gu. Tamper resistant software encoding. Filed under the Patent Cooperation Treaty on Jun. 8, 2000, under Serial No. PCT/CA00/00678;
3. M. Mambo, T. Murayama, and E. Okamoto. A tentative approach to constructing tamper resistant software. In *Workshop on New Security Paradigms*, pages 23-33, 1998; and
4. C. Wang, J. Hill, J. Knight, and J. Davidson. Software tamper resistance: Obstructing static analysis of programs. Technical Report 12, Department of Computer Science, University of Virginia, 2000.

Other suitable techniques would be clear to one skilled in the at from the teachings herein. As well, the most effective approaches for applying these techniques are described in greater detail hereinafter.

Figure 1:
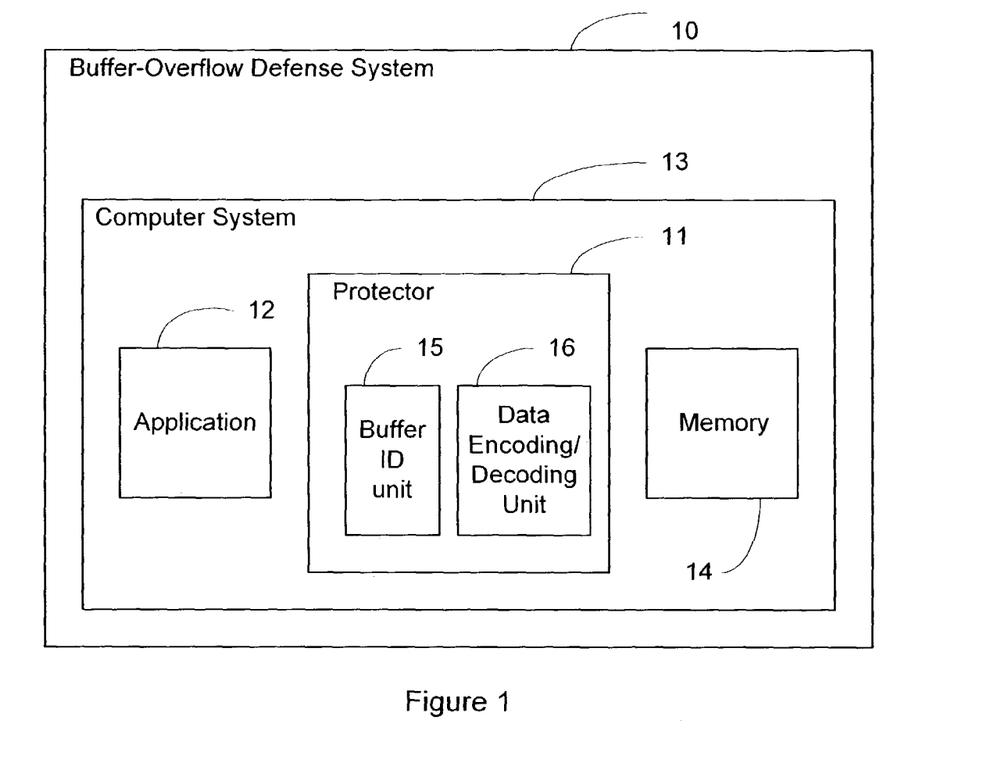
FIG. 1 presents an example of a buffer-overflow defense system for foiling buffer-overflow attacks, in accordance with an embodiment of the present invention.

FIG. 1 shows an example of a system 10 for foiling buffer-overflow attacks, in accordance with an embodiment of the present invention. The buffer-overflow defense system 10 comprises a protector 11, a computer system 13, an application 12 and computer memory 14. The buffer-overflow defense system 10 protects computer systems 13 against remote attacks by altering the data representations (in memory 14) used to communicate information among its components, with corresponding changes to the code manipulating the data in these representations. That is, data stored to memory are encoded, and the necessary decoding information is simply stored in an accessible location (perhaps with the software application itself). However, by varying the encodings with different areas of memory, data which overflows into other memory areas cannot be decoded properly.

Different instances of a protected system 13 are created such that representations differ among instances. Thus, if an attack is designed based on one instance of the defended system 13, the attack will not work against a different instance.

The protector 11 (or protector module) comprises a buffer identification unit 15 for identifying areas in the computer memory 14 which contain buffers, such as arrays, and a data encoding/decoding unit 16 for encoding and decoding data contained in the buffers. The protector 11 may also comprise an application-memory interface unit for intercepting read and write calls from the application 12 to the memory 14.

The buffer-overflow defense system 10 assists in defending against a future attack. Unlike virus- and worm-detection approaches, or profile- or rule-driven approaches, the buffer-overflow system does not depend on historical information. The buffer-overflow system 10 depends on an ability to generate a variety of dialects by which system 13 components communicate. It is difficult and improbable for a cracker to design an attack which anticipates what dialects might be chosen for particular instances of the buffer-overflow defense system 10 defended systems 13 or applications 12.

The protector 11 comprises code which applies a method of the buffer-overflow defense system 10 to an application 12 in order to protect it against buffer overflow attacks. It is the applications 12 on computer systems 13 which are protected against buffer-overflow attacks. As will be described below, a user of the protector 11 may set the application 12/system 13 boundary wherever she wishes, within broad limits, so that setting boundaries is not a limitation on the buffer-overflow defense system 10. However, the method of the buffer-overflow defense system 10 protects the parts of the code and data which the user of the protector 13 defines as application 12, and does not necessarily protect anything outside that boundary. If the user desires broad protection, the boundary may be made broadly inclusive.

Many kinds of attack, and buffer-overflow attacks in particular, write memory according to one usage, and then employ its contents according to another usage. In the case of buffer-overflow attacks, this is main memory; in the case of alien-code attacks, the memory is represented in a file, and the entire program (when loaded) may itself be an attack region in main memory, normally containing many other regions within the entire program region. Furthermore, a fragment of the program, when loaded, may be an attack region, as in the case of a computer virus, which adds a small amount of hostile code to an existing program.

Generally, code associates a usage of main memory 14 as a buffer with an array or array area pointer by which it is accessed. For example, the implementations of many modern programming languages use stack frames to represent the activations of routines, and there is a frame pointer used to access local variables in the frame. This frame pointer is an example of a coarse and imprecise array pointer, which we might use if more detailed information on arrays were not available, e.g., in protecting a program in binary form. Another example is the area pointer returned from the malloc( ) routine of the C standard library, which points to a dynamically allocated and freed block of memory which is implicitly an array.

Preventing memory 14 written according to one usage from being used effectively by a cracker or by malware for some other purpose, can foil an attack which depends on such multiple usages. That is, by using main memory 14 encodings associated with specific arrays or approximations thereof, when the data addressed using one area pointer overflows into another area, the overflow data is wrongly encoded for the area of memory 14 into which it overflows. Hence, the overflow data is nonsense in the new area, and cannot have the effect intended by the cracker.

Thus, the objective is to encode data so that overflows become meaningless.

Figure 2:
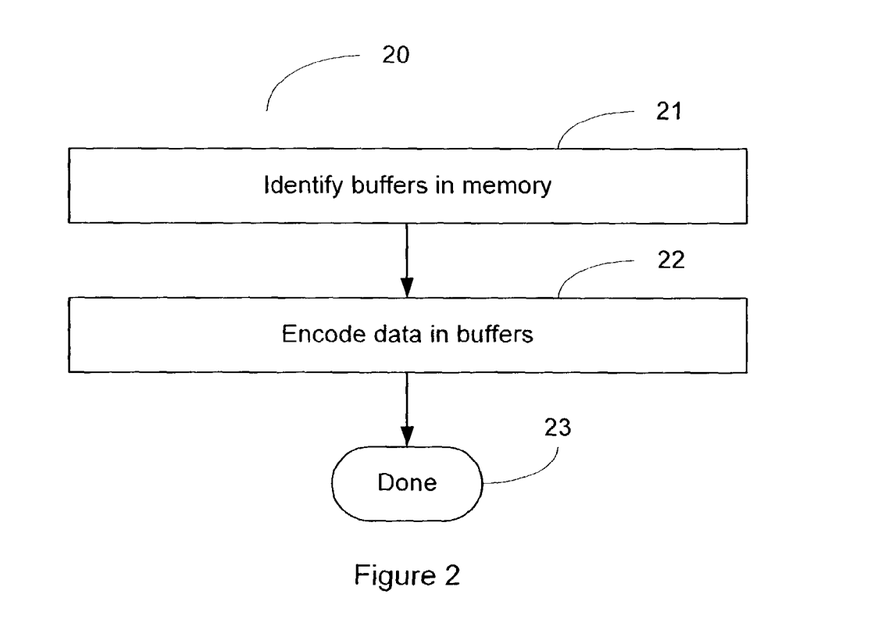
FIG. 2 presents a flowchart showing a method of foiling a buffer-overflow attack, in accordance with an embodiment of the buffer-overflow defense system.

FIG. 2 is a flowchart showing a method of foiling a buffer-overflow attack (20), in accordance with an embodiment of the buffer-overflow defense system 10. The method (20) comprises the steps of identifying areas in a memory 14 associated with a buffer (21), such as an input or output array in an application 12, and encoding data stored in such areas of memory 14 (22). The method used to encode, plus any seeds, keywords or passwords used to perform the encoding, are all stored at step 23, so that the encoding can be decoded when required. The method (20) is done (24).

Figure 3:
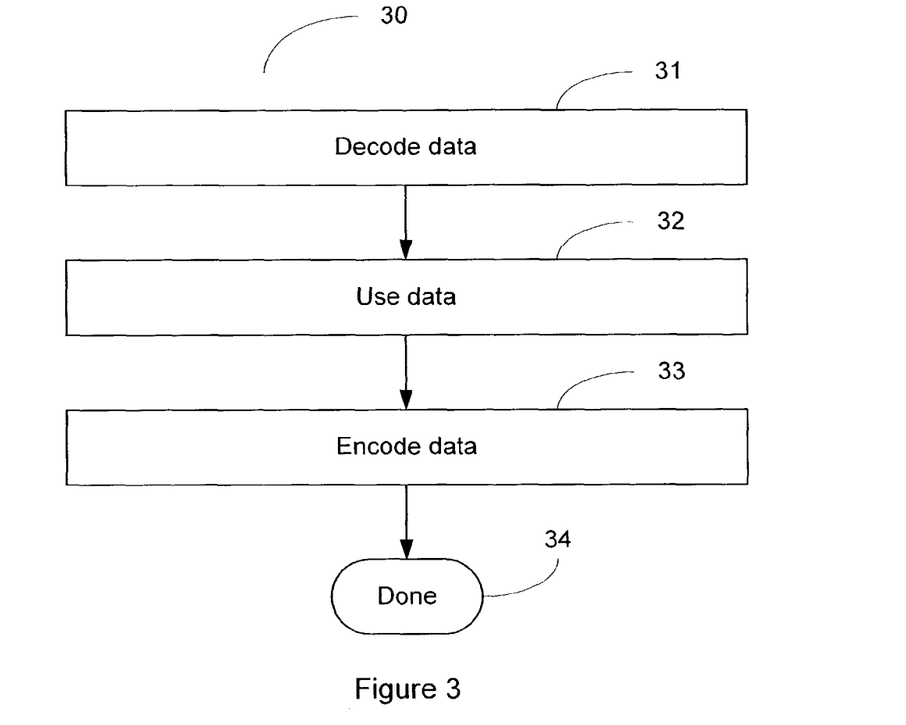
FIG. 3 presents a flowchart showing a method of an application using the protected data, in accordance with the buffer-overflow defense system.

FIG. 3 is a flowchart showing a method of an application 12 using the protected data (30), in accordance with the buffer-overflow defense system 10. When the application 12 needs to access the protected data, the protected data is decoded (31)

and used by the application 12 (32). If the data has been altered at all, it is then encoded and stored back in memory 14 (33). The method (30) is done (34).

Other details and steps may be added to the methods described in FIG. 2 and FIG. 3, as will be described below.

The following will describe how to apply encoding to individual arrays (or approximations thereof, when precise information is not available and we have to fall back on information obtained from binary code by decompiling, for example).

Code may be divided into:
Application code: Code which is part of the particular application 12 and is expressed in its source code.
System code: Code which is part of the run-time support for the application 12 code, consisting of library code for basic utilities supporting allocation and deallocation of memory 14, input and output, and the like, or which is part of the internal representation of abstractions provided by the library code, or which is automatically generated or included by the compiler, linker, or loader to support the abstractions provided by the language in which the source code is written.

The division of code into application and system code is static in many contexts.

Data memory 14 may be divided into:
Application data: Parts of memory 14 which are accessed by code expressed in source form in the application code during normal operation; i.e., within the normal assumed behaviour on which the code, the compiler, the linker, the loader, and the library are based.
System data: Parts of memory 14 which are not application areas, and which are or may be accessed by the library code, or code which is automatically generated or included by the compiler, linker, or loader to support the abstractions provided by the language in which the source code is written.

The division of data memory 14 into application and system data varies dynamically in many contexts. For example, when the system 13 allocates a block of memory 14 for use by an application 12, the portion of the allocated block which is intended for use by the application 12 (as opposed to any system 13 information about the block kept just beyond the limits of the application-usable part) changes from being system memory to application memory. When a routine is called, system code generated by the compiler allocates an activation record so that the local variables in the activation record change from system data memory into application data. The reverse of these changes occurs when an application calls a system application programming interface (API) to return a block of allocated store to the system, or when a routine returns from a call, freeing its activation record. An activation record is the record containing the local variables of the routine, which are application data, together with system data indicating the routine address, the location of the activation record of the calling routine, etc.

The division into system 13 and application 12 can be done at various levels. For example, for the operating system, the language support and the kernel code are the system 13, and the operating system itself is the application 12. However, for a program running on top of the operating system, the operating system is now part of the system 13 and only the code of the program, minus its library support, is application code. A similar consideration applies to the data.

A buffer is a contiguous region of data memory 14 into which an incoming message, argument, or other communicated value, generally in the form of a sequence (typically, a sequence of characters), which is passing from the external world via the services of system code, into data memory 14, or from which an outgoing message, parameter, or other communicated value is passed to the external world via system code services. The buffer-overflow defense system 10 operates on application buffers, which are buffers residing in application data memory.

The form of buffers in a language such as C is somewhat stereotyped. A buffer is generally one of the following:
Explicit array: An explicitly declared array (typically, an array of characters).
Implicit array: A contiguous region of allocated memory with a pointer initially pointing to its lowest (or more rarely, to just below the lowest, or to its highest, or to just beyond its highest) application data address (typically, a character pointer). The type of the pointer target is the type of the elements of the implicit array.
In code generated from C, and often in code generated from C++, the pointer does not provide bounds for the array (unlike the case with languages such as Algol 68 or Protel).

Whether explicit or implicit, the actual array (as opposed to its type, if any) actually has a specific size. The system code has allocated some fixed amount of space for it, and any use of memory 14 beyond that allocation is necessarily an overflow.

A language such as C does not comprise scalar values or structured values created using struct or union constructors being used as buffers. Therefore, to deal with overflows, attention is focussed on arrays. In C++ or other languages, there are further possibilities, such as use of the vector<> template. However, the basic considerations remain the same: buffers are generally strictly contiguous, sequential, flat structures in which elements are added successively at increasing (or, more rarely, decreasing) physical addresses, having a fixed upper (or, more rarely, lower) bound beyond which any further addition is an overflow. In fact, the other possibilities are implemented by underlying explicit or implicit arrays.

Preferably, every implicit or explicit array which might be a buffer, especially if it might be an input buffer, is encoded. Preferably, distinct encoded arrays are encoded differently. In a program in binary form, the division of code into arrays and scalars, and into system 13 and application 12, are likely to be less complete and precise than in the case of a program for which source code is available. As a result, imprecise methods of estimation will be used in such cases. These imprecise methods are known in the art of decompilation, which will generally give a reasonably close approximation to these divisions, but which will not be accurate in every case. Nevertheless, the estimates will be sufficient to make the defense effective.

Although some protection is provided when all encoded arrays use the same encoding (specifically, it protects against attacks involving overflow from application 12 data into system 13 data or into code), it is preferable to strive to encode distinct encoded arrays with distinct encodings. The term 'strive' to encode distinctly is used because:
1. with a binary program, it may not be known as precisely as it would be for a source program where all arrays begin and end; and
2. depending on the encodings, there may not be enough distinct encodings to guarantee that encodings of arrays are unique for each encoded array.

Whether or not the encodings of distinct arrays are distinct, it is preferable to make the probability that encodings of two distinct arrays match, small. The probability that the encoding of an encoded array matches that of system 13 data is zero, since system 13 data is not encoded. For example, if there are 255 distinct encodings, the probability for an arbitrary pair of encoded arrays is less than 0.4%, which means that attacks which work on unprotected applications by overflowing from one buffer into another have a low probability of success on applications 12 protected by the protector 11. Of course, a determined cracker could keep trying encodings until a hit was discovered, but even for purely byte-wise encodings, there are thousands of reasonably fast encodings from which to choose. If encodings with more choices are used (e.g., some reasonably fast encodings provide billions of choices) applications can be protected against concerted brute-force attacks.

Since the defense is against remote attacks, there is no need for much sophistication in the encodings themselves. Indeed, it is preferable that the encodings are kept reasonably simple, since it is better if the protector 11 can be made so reliable that one can count on it to work correctly every time it is applied to an application 12—a principle which has been uniformly applied in the embodiments which follow.

It is preferable that encodings be chosen to have the following characteristics:

1. They should not change the size of data items, since such a change would incur substantial complications in processing programs to install the defense, especially in the binary code context. Such a change is also likely to result in a substantial execution overhead.

Whether this is merely a preference or a requirement depends on the efficacy of program analysis to determine the types and bounds of arrays. The more accurate the analysis, the more freedom there is to change the sizes of data items. However, it is simpler to handle the case where data sizes are not changed.

2. They should be performable using inline non-branching, non-conditional code in a small number of instructions, since this is what will provide the best performance on modern computer hardware.

This is not required, but it is advisable for performance reasons.

3. They should not change the sizes or addresses of data memory 14 fetches or stores, since such changes might also incur high execution overhead.

Again, if the analysis of the code is very effective, this is optional. However, it is easier to avoid the complications incurred by changing data sizes when an application 12 is protected.

Examples of such encodings include the following:

1. The encoding and decoding are done by a bit-wise logic exclusive-OR (XOR) of each byte, B, of the data with a non-zero byte constant, say K. That is, the encoding/decoding formula is $B \oplus K$. Vectors are shown herein as upper case, bold italics, as in B and K, emphasizing that these quantities are viewed as bit-vectors in the computation, and the $\oplus$ operation is a bit-vector exclusive-OR.

For any size of data from a byte up to the largest size of data for which an exclusive-OR operation is provided in the hardware, this permits the encoding or decoding to be done by a single hardware operation.

This provides 255 distinct possible encodings.

2. As in the above encoding, but encoding/decoding uses the formula $B \oplus K \oplus A$, where A comprises the low-order eight bits of the address of the memory byte from which B is fetched or into which it is to be stored.

This provides 255 distinct possible encodings.

3. The encoding and decoding are done using an exclusive-OR of each byte of the data such that aligned byte-quadruples (typically, words) of the data are exclusive-OR-ed with a non-zero byte-quadruple value. That is, there are four byte constants used, and which is applied to a given byte in an encoded array depends on its position relative to the beginning of the aligned byte-quadruple containing it. The encoding byte constants are $K_0$, $K_1$, $K_2$, $K_3$, and the encoding/decoding formula is $B \oplus K_{A \bmod 4}$, where A is the memory address of the byte. The modulus can be computed by a bit-wise AND operation, so the required additional machine code is compact and fast.

This is more complicated, since the low-order two bits of a byte's address become relevant, but it provides an enormously larger variety of encodings: $2^{32}-1$ of them (over 4 billion) instead of 255 of them.

4. Encoding as in option 3 above, but employing 16-byte groups instead of byte-quadruples. The constants are then $K_0, K_1, \ldots, K_{15}$, and the encoding/decoding formula is $B \oplus K_{A \bmod 16}$, where A is the address of the byte. Again, the modulus is compact and fast using bit-wise and (AND).

This is slightly more complex than the above encoding, with the low-order four bits of the address relevant to the encoding and with sixteen constants to use for each coding, but it provides $2^{128}1 \neq 3.4 \times 10^{38}$ possible encodings. For such an encoding, a brute-force remote attack or attack by viruses or worm programs is like a brute-force attack on 128-bit advanced encryption standard (AES) encryption: it is totally infeasible in practical terms. After the attempted attack has been proceeding for a long period of time, someone is likely to notice and take steps to prevent its continuance.

5. Encoding is done by adding a byte constant K (modulo 256) to each byte, and decoding is done by adding the complementary constant 256–K (modulo 256) to each byte.

This provides 255 distinct possible encodings.

6. Encoding as done in option 5 above, and then performing one of the possible exclusive-OR based codings, and for decoding, applying the decodings in reverse order.

This provides over 32 thousand possible encodings.

7. To encode a word, add some constant K, modulo the natural word modulus W (typically, $W=2^{32}$), using unsigned (or equivalently, 2's complement) arithmetic with overflows ignored; to decode a word, add the constant (W–K), modulo W, using unsigned (or 2's complement) overflow-ignored arithmetic. Encoding or decoding can then typically be done in one hardware instruction, just as with exclusive-OR, since the modulus operation is provided by the normal hardware behaviour of addition with overflows ignored.

This provides $2^{32}-1$ possible encodings.

Many other codings may be derivable from the teachings herein.

In general, a bijective encoding may be used which is not the identity encoding and which permits the encoding of data of various sizes used in connection with the encoded array (a bijective encoding is one which does not lose information; the identity encoding leaves the data unchanged). It is preferable that the encoding be implementable by inserting straight-line code, with at most a few instructions to encode, and a few to decode, and with a high execution speed. Whether the protector 11 must handle small sizes, such as a byte, or only a fixed size, such as double-bytes or byte-quadruples, depends on the type and usage of the array. If data is always accessed in larger sizes, the number of convenient, distinct possible encodings is larger. As noted above, by using address-dependent codings, such as the byte-quadruple or 16-byte encodings above, it is possible—at some increased cost in overhead—to lock out arbitrary and concerted brute-force attacks.

Even if the protector 11 just uses an 8-bit exclusive-OR mask, the probability that a given piece of malware will succeed on a random buffer-overflow defense-protected instance is only 0.4%, which is low enough to slow down the propagation of self-replicating malware, such as a virus or worm program, effectively. Using only the byte-wise encodings listed above, there are over 32 thousand choices, which would give a probability of about 0.003% of success, and would take an average of over 16 thousand tries to crack using a brute-force attack. Considering the number of steps and time it takes to perform such an attack remotely, and the time it takes to execute such attacks remotely, this is already sufficient to lock out all but the most extremely patient crackers, or crackers using heavy-duty attack automation.

If an even more effective defence against programmed attacks in general is desired, an encoding such as the 16-byte-group encoding may be used. This raises the average number of tries needed for penetration by brute-force searching totally beyond what is currently feasible using a remote attack. The larger the byte-group encoding used, the stronger the defense.

The brute-force attack is the only feasible remote attack on any given buffer-overflow vulnerability, because getting more refined information other than success or failure takes a high level of privilege, which normally cannot be obtained until after the attack succeeds. If the system 13 under attack has non-buffer-overflow vulnerabilities, then penetrating the buffer overflow defense is not necessary.

The general effects of applying the above methods on buffer-overflow attacks will be described.

In the case of a stack overflow code-execution attack, suppose an application 12 has the following vulnerability: there is a message buffer stored in a local variable declared in a routine, which will be allocated on the stack at run time. For example, this kind of vulnerability was found in the Unix™ rdist utility for Solaris™ 2.x and SunOS™ 4.1.x, and for other systems running an old rdist with setuid root selected. Suppose the application 12 is running on the (most common) kind of processor, where stacks grow towards lower addresses, with a routine's local variables stored below the linkage, so that the buffer overflow can overwrite the linkage information for the routine, including the return address.

A cracker engineers a situation which results in an overly-large message being placed in this buffer. The return address is overwritten with the address of the next word, and the remainder of the message consists of executable machine code to do whatever the cracker wants, using the privileges of the application 12 itself—say, propagating itself over the Internet using the user's address book, and then erasing the computer's hard drive.

When the application 12 receives this message, it is placed in the buffer, overwriting the return address with the address of the next word, which begins our desired machine code constituting the remainder of the message. When the routine attempts to return, it branches to the code location now stored in the return address, resulting in the execution of the machine code placed at the end of the message, as if it were the application's 12 own code, propagating itself over the Internet by means of the victim's address book, and then erasing the computer's hard drive.

Now consider what happens when this attack is applied to an instance of the application 12 protected by the protector 11. The message is placed in the buffer (in the encoded form for that buffer, since it is ostensibly data), and it overwrites the return address, as expected. The application 12 sees the message just as the undefended application did, because data items are encoded on write and decoded on read. However, when the routine attempts to return, the return address is not stored as the address of the next word, but rather some random address resulting from its encoding, and the remainder of the message is not the cracker's desired machine code, but rather some strange string of bytes resulting from its encoding. As a result, when the return address (which is not decoded on read, since it is in system data memory 14) is used for the return, the code branches to some unpredictable location, and the application crashes.

Crashing may not sound ideal, but:
  it is less painful than losing the contents of the hard drive and taking down the local Intranet, not to mention a number of colleagues elsewhere, and
  it is the kind of behaviour the unprotected application would have shown, when handed an overly long message which was not part of an attack.

Suppose the cracker obtains access to a particular instance of the application 12 protected by the protector 11. She can then determine the encoding for the particular buffer and adjust the attack's message so that it allows for the encoding used in that particular instance of the application 12. However, it is useless for attacking any other instance, since the encoding will be different and the adjustment will not work.

Hence, using the buffer-overflow defense system 10 defends against outsider attacks by using a different variant from one company or organization, to another. The system 10 can also protect against insider attacks by refreshing the instances of applications 12, using varying encodings, at random intervals, so that specialized insider knowledge of particular buffer encodings gained today is useless tomorrow.

The effect of the buffer-overflow defense system 10 on other forms of attacks, such as static/heap/per-process overflow scripting or uniform resource locator (URL) attacks, is similar.

Communication buffers are located in three kinds of memory 14: the routine-activation stack, which holds the run time data of routines during their execution, static memory which is part of the program as loaded, and heap (dynamically allocated) memory which is allocated while the program is running by some utility such as malloc( ). There may also be data specific to a particular thread of control, a concept supported in Microsoft Visual C™.

Buffer overflow attacks generally seek to make something illicit happen, either by causing machine code provided by the attack to be executed, or by passing a message which causes the attacked system or application to perform an illicit action (e.g., by providing a command script or an URL).

Consider the scripting or URL possibilities. Suppose the buffer resides in the heap or in static memory. The cracker may either make the message overwrite an array where a script or an URL was expected by the application, or it may pass both a script or URL address where the application expected a script or URL address, such that the address points to a part of the message containing the illicit script or URL. The script can take any hostile action permitted by the scripting language; the URL can act as a gateway for other hostile scripts or other web-based attacks.

In any case, when the cracker's message is placed in the buffer of the intended victim version of the attacked application 12 (or system 13), the overwriting intended by the cracker occurs, resulting in the eventual execution of the hostile script or use of the hostile URL, and the attack succeeds.

However, when the application 12 is protected using the protector 11, the following behaviour ensues (recall that various buffers are generally encoded differently); either:

1. the hostile script or URL overflows from one buffer into another array, so that when the application attempts to execute the script or use the URL, it fails because it was written with the encoding of the overflowing buffer, but read (with high probability) with the different encoding (or, if the array is known not to be a buffer, no encoding) of the array into which it overflowed; or
2. the address was written as data, and hence, encoded with the encoding of the overflowing buffer, but either read with no encoding (because it is not in a buffer) or read with the different encoding of the array in which it resides, so that the address is unpredictable and does not point to the illicit script or URL as the cracker intended.

Various results may follow, ranging from an 'illegal script' or 'illegal URL' error, to a crash. Again, the damage intended by the cracker is avoided, and the possible responses of the application are no worse than those that would be caused by overly-long messages which are not part of an attack.

And again, access to a given instance protected according to this invention does not provide a means of attacking other instances, so that the buffer-overflow defense system 10 can be used to defend against both outsider and insider attacks.

There are ways in which the encoding defense according to the buffer-overflow defense system 10 could be compromised, so these must be considered in implementing the invention:

1. Configuration and Protocol Flaws:
    There may be ways to penetrate the defense provided by the protector 11 using flaws in protocol design or incorrect system 13 configuration (e.g., leaving an exposed guessable password providing privileged system access over the Internet).
    The protector 11 protects against buffer overflows. It does not protect a system 13 whose normal defenses have been weakened by improper configuration or programmed-in permissive protocols, which permit the defense to be, not penetrated, but bypassed entirely.
2. Insufficient Knowledge of the Protected Application:
    The other major kind of penetration which is possible occurs when the protector 11 is applied with insufficient information about where arrays begin and end, making complete coverage impossible.
    This can happen when the protector 11 is applied to binary code, for example: decompiling is inexact in the current state of the art. This may result in multiple arrays being treated as single arrays, or entire routine activation records being treated as single arrays, which might permit some exploits to occur by making encodings common where, were the available information about the code greater, they would be encoded distinctly, so that the defense against an overflow from one into the other is omitted. The protector 11 uses information about arrays, and especially arrays used as buffers. One can make the assumption that any array which might possibly be a buffer is in fact a buffer (thereby encoding more arrays than strictly necessary, with higher run-time overhead but no weakening of protection). However, one cannot always guarantee the effective handling of situations where arrays cannot all be separately identified, which may result in an area of memory which, according to the source code, contains multiple arrays, as if it comprised a single array. As a result, some overflows may be defended only by a common encoding where multiple encodings would be more effective. As a result, certain buffer overflow attacks may still be effective. Those which depend on compromising system data, or data outside the arrays discovered during the protection process, may still fail, but those which depend on overflow from one application 12 array into another application 12 array, may sometimes succeed.
3. Foiling Buffer-Overflow Attacks with Good Information:
    Penetrating the defense provided by the buffer-overflow defense system 10 for code in source form, or other code which can be effectively analyzed by whatever means, using a buffer overflow attack, can be made very difficult indeed, and (with full deployment) practically infeasible.
    The reason is that a buffer overflow attack can only succeed when it can initiate its first illicit action. The protector 11, when deployed with full coverage, converts the illicit action to nonsense behaviour, so the first illicit action, with high to extremely high probability, cannot occur. Hence, any subsequent steps which might have happened are irrelevant: the attack will not even make it to its first step.
    Even relatively simple encodings, such as a 32-bit exclusive-OR mask applied to each 32-bit word (quad-byte encoding), provide massive diversity, and hence, very low probability of attack success: the cracker has one chance in about four billion of guessing right. Furthermore, if the attacker sends millions of exploit instances looking for the right mask, someone is likely to notice. 128-bit masks (16-byte-group encodings) make the search space not only impractically large, but infeasibly large: attempting a concerted crack would be like a brute-force search for an AES cryptographic key, but with very slow steps (it takes time for malware to make its way over a communication network).
    One way a cracker can penetrate the protector's 11 defense, when the full power of the defense is deployed using comprehensive information about the protected code, is to have access to the specific attacked instance when designing the attack. But this has very limited payoff for the cracker because all other instances are different, and the instances can be varied over time as well.
4. Foiling Most Buffer-Overflow Attacks with Incomplete Information:
    Since decompilation is fairly effective, good protection can be provided for binary code, but since decompilation is not perfect, perfect protection for binary code cannot be provided.
    Even when the information available is incomplete, the protection provided by the protector 11 can make a successful attack much less probable. That is, even if the defense is applied to binary code and is not as comprehensive as for source (unless sufficient auxiliary information is available to fill in the required characteristics of the code such as exactly where arrays are), or even if we intentionally use lower levels of diversity (simpler, faster, more compact encodings) for the sake of maximizing execution speed, deployment of the protector 11 has strong economic justification:

It makes it much less likely that a given attack will succeed, whether the attack is a buffer overflow attack or an alien executable attack.

It slows down tremendously the rate of propagation of buffer-overflow-based self-replicating viruses and worm programs over the Internet.

That is, deployment of the invention's defense constitutes good Internet citizenship: the user makes the Internet safer for other 'netizens', as well as herself.

Therefore, it will significantly reduce the costs induced by remote attacks over the Internet. Since buffer-overflow vulnerabilities comprise many of the most serious vulnerabilities, they account for a high proportion of the economic damage caused by remote attacks. Alien executable attacks are another major remote attack category against which the invention also provides protection.

Figure 4:
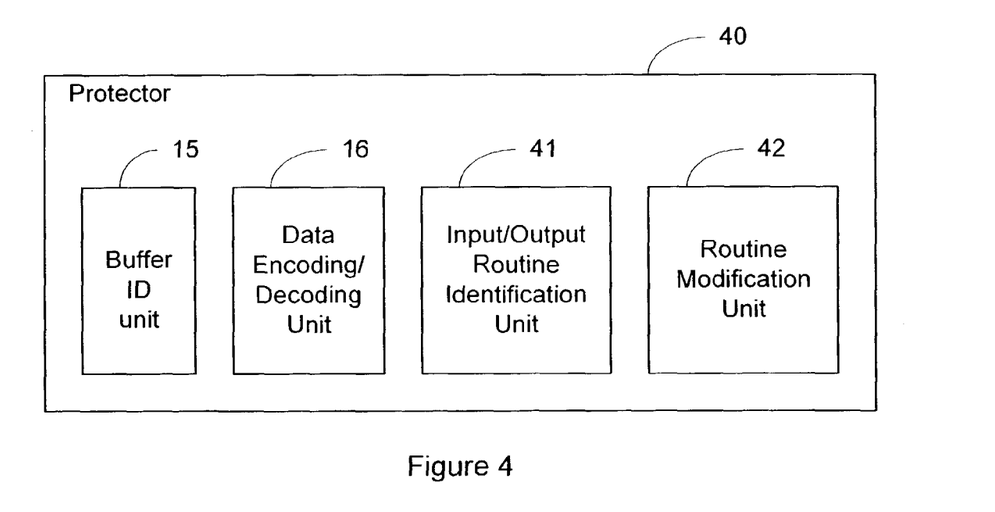
FIG. 4 presents another example of a protector in accordance with the buffer-overflow defense system.

FIG. 4 shows another example of a protector 40 in accordance with the buffer-overflow defense system 10. The protector 40 comprises a buffer identification unit 15, a data encoding/decoding unit 16, an input/output (I/O) routine identification unit 41, and a routine modification unit 42.

The remaining disclosure will describe embodiments of the buffer-overflow defence system 10 with reference to the protector 40. Appropriate modifications may be made such that the following disclosure also applies to the protector 11.

Up to this point in the description, the interior of an application 12 has been considered, i.e., the application 12 minus any input from the outside world or output to the outside world. It has been assumed that, given the encodings for regions, the program which transforms an application 12 to its protected form can always determine which encoding is appropriate for any pointer into that region.

The application 12 will now be further considered, including pointers with non-static codings and in its containing context, i.e., pointers for which the protector 40 may not be able to determine statically which coding to use; thus, a dynamic coding determination is used in the running application.

The protector 40 deals with
- the transition from the exterior of the protected application 12 to its interior and vice versa;
- the cases where a pointer's coding must be determined dynamically; and
- applications 12 which may have been compromised by the attachment of virus code, or applications 12 such as worm programs which may themselves constitute an attack.

Recall the division of code and data into system 13 and application 12 parts above. For the following disclosure, the application 12 boundary is crossed by data being passed by the system code from system memory or an input device into an application buffer, or being passed by system code from an application buffer into system memory or to an output device. The boundary lies between information managed by the system 13 and the data arrays which are part of the application 12.

It has been assumed up to this point that any data crossing this boundary was properly encoded for its receiving location, except that it might possibly occupy too much space and thereby overflow into data beyond its normal extent. The following will now describe how this boundary-crossing encoding may be provided in connection with the buffer-overflow defense system 10.

Input and output are generally handled by specific routines provided by the system 13, which are called with the application buffer as an argument in order to perform the desired input of external information into the application buffer or output information from the application buffer into the external world. This system routine may move the data to or from a hardware device, or to or from intermediate memory and subsequently to a hardware device, in various ways. The information may also be transferred from one application 12 into another application 12, as when a message is passed from one running process in the system 13 to another. Whatever the handling of the information by the system 13, from a given application's 12 point of view, it is generally either an input or an output, or (in some cases) both.

For the purposes of the protector 40, if any such input and/or output routine is converted to inline code embedded in the application code, the protector 40 considers it to remain part of the system 13 if it deals with system data, and part of the application 12 if it deals only with application data.

A special case of input followed by (or intermixed with) output occurs when a system routine is used to transfer data from one location to another or to process a block of application data and then either modify it or return a sizable result in another location. For example, in the standard C library, routines such as strcpy( ), strncpy( ), and memcpy( ) have such behaviour.

These routines are identified when source code is available, of course, because their identification is clearly specified by system libraries. Even in the binary context, because of the stereotypy of their code or their association with specific code locations (such as in connection with shared objects in Unix™ or GNU/Linux systems, or dynamic link libraries (DLLs) in Windows™ systems), identifying such routines is not difficult.

The first step in handling the application 12 boundary, then, is the identification of all calls to such routines and the arguments and results of these calls. After calls to input/output routines have been identified, their behaviours are filtered by either changing the code to use a variant routine provided as an extension to the library, or adding code to pre- and/or post-process the results of the call.

For example, the standard C library function strcpy( ) copies a null-terminated string of characters (normally bytes) from one place to another within the application's memory. The from-string is expected to be terminated by a null (character code zero) character. If the string is encoded, though, the final character of the string, which is read as zero by protected code (which decodes it), is actually stored according to the encoding; i.e. it is actually not zero.

If strcpy( ) is used 'as is', and with no restrictions on the codings, the copy may continue beyond the string to copying the following data until it eventually encounters a null character or runs entirely out of addressable memory, or it may stop copying before the entire string is moved because it encounters a character whose non-zero character code happens to be encoded as zero in memory.

To avoid this situation, one of the following (or a variation thereof) may be performed:

1. Provide an additional library routine—say, strcpy encoded( )—which takes a description of the encoding and decoding in effect for the from- and to-strings and uses these to read the characters, including the terminating sentinel character, in the from-string according to its encoding, and to write the characters, including the terminating sentinel character, in the to-string according to its encoding.

The protector 40 then changes strcpy( ) calls into strcpy encoded( ) calls wherever an encoded from-string or to-string (or both) is involved.

The additional library routine can either be written directly into the application code by the protector 40, or a separate new routine can be added to the library used when linking together application code.

Since this provides the most opportunities for optimization, it is likely to provide the best performance.

2. The protector 40 changes the code so that, just prior to the call to the strcpy( ) call, the from-string is decoded according to its encoding, and just after the strcpy( ) call, the to-string is encoded according to its encoding.

3. As in the approach of item 2 above, with the addition of a library routine—say str_recode( )—which performs the service of recoding (i.e. decoding input, encoding output, or combining the decoding of input and the encoding of output into a single combined recoding as characters are transferred) strings according to a description of the recoding, and performing the encodings and decodings of the previous approach by inserting appropriate calls to this routine into the application code so that the protector can ensure that they are performed just before and just after the call to strcpy( ).

(All of the above provide the same level of protection: the difference is in performance.)

Approaches such as those above, and their variants, suffice to handle data crossing the application boundary from the exterior world into application buffers or from application buffers into the exterior world. In particular, input/output (I/O) routines are handled by simplifications of the above approaches (or variants thereof), since they are normally unidirectional, whereas strcpy( ) is bidirectional (both input and output).

In the foregoing, it has been assumed that coding is statically selected: i.e. except inside routines such as strcpy encoded( ) or str_recode( ) recently mentioned in the previous section, the protector 40 can always determine statically what coding, if any, is appropriate for memory accesses with any given pointer into a buffer or potential buffer. The coding may vary over time, since a given pointer may point into more than one buffer during the execution of a given application. The protector 40 may disambiguate pointer usages (i.e. determining which coding a pointer must use at run time). This can be done statically by alias analysis or dynamically by various other means.

The statically analyzable case is a common one, and the protector 40 may be designed to take full advantage of this fact for the sake of performance.

The general aliasing problem for sufficiently powerful programming languages, such as C, C++, and their allies, is undecidable; i.e. it is known on theoretical grounds that it cannot be solved statically in general. More restricted aliasing problems, which involve restricting assumptions (or require restricted contexts) either provide limited information or are computationally prohibitive.

This being so, there may be circumstances in at least some applications 12 where the protector 40 must add to the protected application 12 some means for dynamically identifying the appropriate coding for memory accesses via a given pointer at run-time (i.e. for disambiguating pointer usages at run-time).

In addition, there are circumstances in which it is desirable to provide varying encodings for pointers handled by the same code. For example, in a group of one or more routines which are part of an inter-recursive set (i.e. which lead to call graphs containing loops), there is a possibility that a buffer in one of these routines in one activation record overflows into a corresponding buffer of the same routine in a different activation record. To protect against buffer overflow attacks making use of this, the two buffers should have good probability of being encoded differently, which requires that their encodings be chosen dynamically.

The following describes ways in which such dynamic association of codings with pointers can be achieved.

1. Fat Pointers:

Conceptually the simplest way to handle the coding identification problem is for the protector 40 to change the format of a pointer to indicate which coding applies to the data to which it points. This is called this the fat pointer approach because the pointer contains additional information, and may, in fact, be physically larger to make room for it.

This is feasible for some applications 12, particularly where the application 12 is in source form (or in binary form but with a good deal of auxiliary information). However, it requires that the protector 40 add filtering code for pointer values as they are transmitted between the system 13 and the application 12, since the system 13 will not handle such pointers in general, unless alternatives are provided for every routine interface in the system 13 dealing with pointers—a major undertaking in itself for most systems 13. That is, the pointers must change from fat to ordinary when crossing into an unmodified system routine, and from ordinary to fat on the way back. And converting from normal to fat may require another technique, such as the mapped memory approach described below.

In addition, if fat pointers are physically larger than normal ones (i.e., if both a coding identifier and the address into the space normally used for a pointer cannot be fit), then good analysis to make the use of fat pointers feasible for an entire application 12 is needed.

Moreover, in applications 12 where many multi-linked dynamically allocated structures are used, pointers may occupy a significant portion of the allocated space, and hence, fat pointers may make a significant difference to a protected application's 12 memory requirements.

Also, even when the coding for the target data of a pointer must be determined dynamically on occasion, it would often be possible to determine statically that two accesses, whether from the same or different pointers have the same coding (e.g. one of the pointers might be derived from the other in a manner which guarantees this). Therefore, only some of the uses of a given fat pointer would require extraction of its coding information.

However, the fat pointer approach may be suitable for handling the dynamic coding identification problem for some of the pointers in an application 12, even in programs where it cannot or should not be used to solve the problem for all of the pointers.

2. Mapped Memory:

Another approach is for the protector 40 to modify the application 12 so that it keeps some form of mapping information which indicates, for a given address-range in application data memory, which coding applies to it. Such a mapping need not be applied for all of the encoded arrays in application data memory, but only to those which may be or may contain pointer targets, where the pointer cannot always be associated with an appropriate target coding statically or by use of the fat pointer approach described above.

This mapping information is called the code map. Each entry in the map contains data providing the beginning and ending of a region of memory and a code identifier indicating which coding should be applied for it. Regions of memory which are not coded can be omitted from the map.

This has the advantage that the format of pointers is not changed, so no filtering is required when pointers are transferred between the application 12 and the system 13. It has the disadvantage that the code map is searched to determine the coding to be used for the target data for a given pointer, which is slower than simply extracting the information from a fat pointer. On the other hand, other pointer accesses which are determined to use the same encoding as the one determined by a particular reference to the code map are potentially faster, since there is no overhead to handle the extra information or the non-standard pointer format which is used for a fat pointer.

If every access via a pointer uses the information in the map, then overflow information will be encoded correctly instead of incorrectly when a buffer overflows. The approach may be extended so that this will almost never occur in practice, because of the way the map is used. Buffer overflows tend to happen in one access, or in a sequence of accesses, using either a single pointer passed to the system, or a series of successive pointers which can easily be determined to be derived from their immediate predecessors. In such cases, the code map could be used initially, and the other codings could be determined statically to be the same as the initial one, so that the overflow will indeed be encoded incorrectly for the region into which it overflows. Not only does this ensure the desired protection, but it improves performance.

There are many ways in which such a memory map can be constructed which are known in the art of main-memory data structure design. Hash tables are an example. One particular variant of the hash table approach is to use a truncated address, in the manner of a hardware direct-mapped cache memory.

Preferably the map is stored as an Adelson-Velskii and Landis (AVL) tree, which has the advantage that entries can very easily be added to or removed from the code map as potential buffers are allocated or freed. It also has the advantage that pseudo-entries for uncoded regions of memory 14 are easily computed using the code map, which is useful in connection with the caching method described below.

Uses of the code map will occur during the execution of the application 12, whenever a pointer is used for which the protector was not able to determine statically which coding to apply. This can happen either because the memory 14 was dynamically allocated in some group of allocations which have no sufficiently specific static association, or because it cannot be determined statically to which of the potential buffers with known codings the pointer will point at run-time.

The storage for the map can be allocated separately from the other application 12 data memory, but this has the disadvantage that maintaining it as it may grow and shrink during execution may incur added overhead.

It is therefore preferable that the map is distributed in association with the pointer usages as follows:

1. If a potential buffer which needs to be represented in the code map lies within static storage allocated when the application 12 is initially loaded, the protector 40 could augment the initial allocations for the application 12 with sufficient added space to store an entry of the map (e.g. a node of the AVL tree) for that potential buffer. The loaded program, when it is loaded, can then contain an initial version of the map which contains these entries (e.g. these nodes of the AVL tree), which are always present: they are never removed from the map.
2. If a potential buffer which is to be represented in the code map lies within a routine stack frame, the protector 40 could augment the stack frame with added sufficient added space to store an entry of the map (e.g. a node of the AVL tree) in the frame for that potential buffer. It then adds code to add such nodes to the map when the routine is entered, and to remove them from the map on exit from the routine.
3. If a potential buffer which is to be represented in the code map lies within a block of dynamic store allocated by a call to an allocator routine such as malloc( ), the protector 40 could augment the allocation with added sufficient added space to store an entry of the map (e.g. a node of the AVL tree) in the frame for that potential buffer. It then adds code to add such nodes to the map when the block of storage is allocated, and to remove them from the map when it is freed (e.g. by a corresponding call to the free( ) routine).

3. Encoding Caches:

If the code map described above were used naively, each access to the map would be much slower than a normal pointer access. To increase the efficiency of the above approach, it is preferable that the protector 40 insert a code caching strategy into the protected application 12, as follows:

One of the very common cases is that accesses to memory 14 made by a particular instruction sequence in the code (which sequence may be executed many times during the run of the application 12) will often use the same mapping on two successive executions, or will use a small number of mappings within a group of successive executions.

This 'coding locality' can be used in much the same way that a data cache takes advantage of localities in data addresses. The mapping information may be stored in locations allocated for that code, either in static globally allocated memory, or in the stack frame for the routine containing the code sequence in question. The mapping for the most recent access could be stored, or the last n mappings used, where n is not too large—say, not more than five entries. Then whenever locality works to the application's 12 advantage, a slower lookup in the code map is replaced by a faster lookup in this cache. An entry in the cache may either be an entry from the code map, or a pseudo-entry indicating that a region of memory is not encoded. Each of these small caches is called an encoding cache.

In particular, if the number of entries is small, the lookup code for the cache can be inline instructions rather than a routine call, and the lookup can be quite fast whenever the cache contains coding information for an address range containing the pointer target.

When it can be determined that the coding for a particular pointer is the same as that for a previous access whose coding is either statically known or was derived from one of the above-mentioned caches or from the code map, no lookup in either one of the caches or the code map is required, and the access occurs with no overhead beyond the encoding or decoding itself, if any.

4. Combined Approaches:

As noted above, the fat pointer, code map, and encoding cache approaches described above can be variously implemented and variously combined to optimize the efficiency of the needed dynamic identification of data codings. In fact, it is preferable that such combinations be deployed wherever they can improve the efficiency of the code produced by the protector 40 for a given application 12.

Many variants of the above techniques may be performed.

5. Passing Data to and From the System Using Run-Time Code Information:

It often happens that system I/O routines are provided with access to application data by pointers which are passed to the system routine. One approach to handling this is to modify the system routines along the lines previously discussed in connection with the application 12 boundary in the section on filtering, above.

When this is done in connection with fat pointers or pointers for which the appropriate coding must be derived using the code map or encoding caches, it is preferable to handle this situation by decoding the data immediately prior to calling the system 13 routine, and encoding the data on return from the system 13 routine. Thus the system 13 routine needs no modification, and the encoding needed for the defense is preserved whenever the data accessed using the pointers are under the control of the application 12.

That is, passing the data to the system 13 is basically treated as a read, and receiving any data back from the system is treated as a write, of the encoded region of memory 14.

Figure 5:
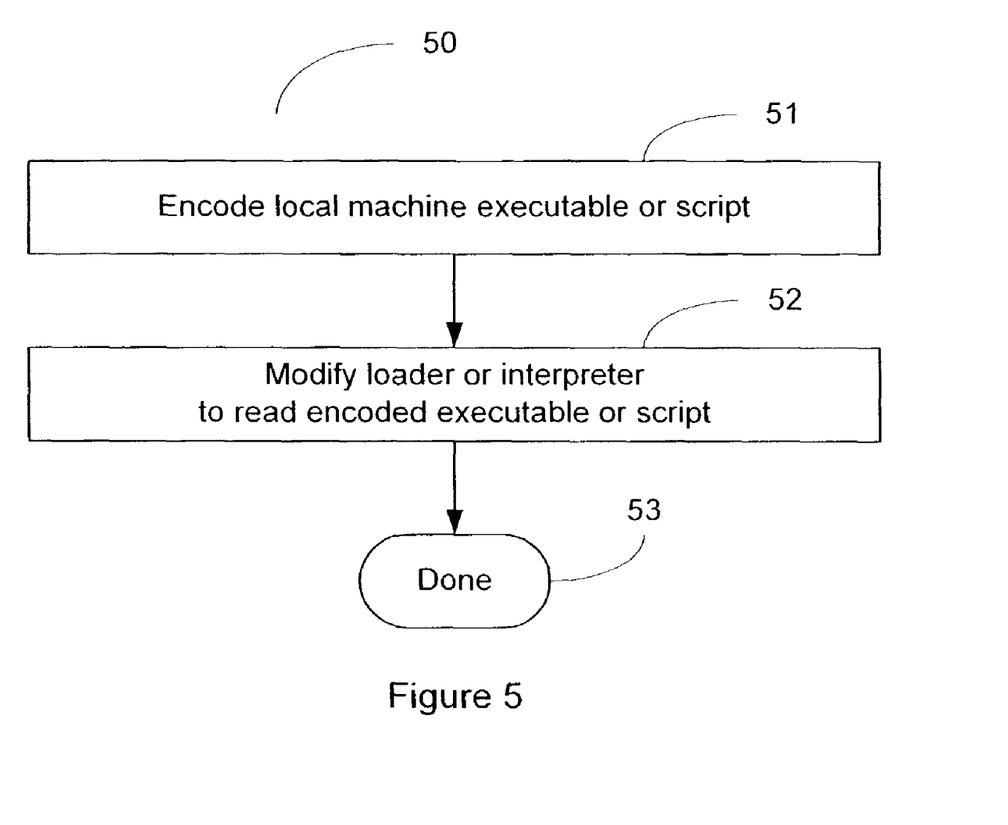
FIG. 5 presents a flowchart of a method of foiling alien-code attacks, in accordance with an embodiment of the present invention.

FIG. 5 shows a flowchart of a method of foiling alien-code attacks (50) in accordance with an embodiment of the present invention. The method (50) comprises the steps of encoding the local machine executable or script (51), and modifying the loader or interpreter (52) such that it is able to read the encoded executable or script. The method (50) is done (53). Further details are described below.

Executable code from external sources may arrive in the form of a so-called executable file containing specially formatted machine code and data, or in the form of a script file, containing instructions which must be interpreted in some way before they can be executed by a computer.

Both executable files and script files can be, and often are, transmitted over the Internet, thereby becoming alien executables, and both can contain a cracker's hostile commands: i.e., both can be harmful—and sometimes extremely harmful—on a computer which runs them.

Generally, an executable file (called a machine executable) contains data in a special format which is intended for loading and execution by a loader (a program which converts the data in the file into executable machine code in main memory, and transfers control from itself to the starting location in this machine code).

The binary representation of machine instructions and data in such a file is normally very close to their binary representation in main memory 14, but certain blocks of data memory 14 which are pre-allocated when the loaded program begins to execute (block started by symbol (BSS) blocks and the like), are not represented by blocks of data in the file, but are represented by an indication of the block's address, size, and possibly initial data contents (such as all zeros), and certain addresses and identifying numbers or codes (fix-ups, such as the addresses and indices of routines within shared objects or DLLs) are not represented in the file, but are provided in some encoded form which is replaced by the appropriate actual values, numbers, or codes as the code is loaded.

In the case of a script file (called a script), the format of the executable code is typically different from the machine code of the computer on which it is to be executed. Instead, the code is executed by an interpreter of some kind. The interpreter may operate in various ways:

1. It may simply read the code and obey the encoded commands in it one at a time, so that the number of times a command is interpreted into an action is equal to the number of executions of the command. This kind of execution is found in older interpreters for Bourne shell scripts for Unix, for example.
2. It may read the code, recode it into a more convenient form, and then use an interpreter for the more convenient form to execute the code. This approach is used for Perl scripts, for example.
3. It may read the code, and recode it into highly stereotyped machine code, where each high-level command of the recoded form is also a machine code sequence whose effect is to carry out the command (threaded code). This approach is used for Forth source programs, for example.
4. It may read the code and compile parts of it into optimized machine code on a cached basis using a 'just in time' compiler (a JIT). This approach is used by the Smalltalk 80™ and Java™ virtual machines, for example.

Any combination of the above approaches may also be used. For example, a Java virtual machine may both interpretively execute bytecodes and employ a JIT.

However it is accomplished, any program which uses such an approach, or a combination of such approaches, in which the executable code is not machine code and/or is considerably modified prior to execution, and is executed by the program which reads the code, is called an interpreter. As a corollary, the term script in a very broad sense will be used: for example, Java .class files or .jar files will be considered to be scripts.

Although machine executables and scripts, as defined above, are superficially different—the former are executable with very limited change in format; the latter only with significant changes—they represent a single problem: they are executable, and when programmed by a cracker and received from outside a given computer system, they may cause substantial damage.

The largest problem with alien executables is that code is very much the same kind of thing irrespective of its point of origin or the purpose of the person or persons who originally created it. Schemes based on cryptographic code signing can provide highly effective protection for ensuring that the received code is the code that a known sender intended to be received, but such cryptographic schemes require additional infrastructure, one must be able to trust the sender, and the requirements of such an approach limit the ways in which we can work.

Moreover, merely marking executables superficially with identifying tags is insufficient. For example, script files on Unix or GNU/Linux systems may begin with the 'shebang' notation, which indicates what program could be used to interpret the executable code. This could be extended with identifying information which could be checked as interpretation begins, but this would be quite inadequate: parts of executables may be hostile. For example, a virus attaches itself to an existing executable and makes its hostile action part of the behaviour of the executable to which it is attached. In this case, most of the code is benign: only an added part—normally a small portion of the code—is hostile.

Hostile code is not identifiable in general—that is well beyond the state of the art. Computer programs cannot understand a programmer's intent, and even human programmers cannot guarantee to do so. The best that can be done is to have a reliable way of identifying code from an external source, whether it is an entire executable or a fragment of an executable. That is, there should be a reliable way of identifying alien code.

The method for protecting against viruses is almost identical to the method of defense against buffer overflow attacks: it applies the same kind of encoding method in a different, but analogous, context. The method for protecting against alien programs is a natural extension of this virus-foiling defence.

In any case, the above method of protection against viruses and other hostile code fragments, and its corollary, the protection against hostile programs, can be applied in quite similar ways, whether we are protecting against potentially hostile alien machine code using a protecting loader, or against potentially hostile alien script code using a protecting interpreter.

The protection against potentially hostile code fragments, whether the code is machine code or script code, is derived from the approach to buffer overflows. In a buffer overflow, it should be ensured that data which overflows, if specially written by a cracker to perform some hostile or illicit action, will fail to do so since the overflow will be written with one coding unknown to the cracker, and read with another encoding (or for system data or code, with no encoding). That is, the interpretation of what the cracker provided will be incorrect from the cracker's point of view, so that it will fail to perform the function intended by the cracker.

This leads to an effective way to protect against alien code fragments appended, prepended, inserted, or overwritten into a legitimate piece of local executable code (whether it is a machine executable or a script). An encoding may be used for local scripts or machine executables. For this purpose, it is preferable to use an encoding such as the 16-byte group encoding described above, which provides extremely high diversity and is infeasibly difficult to attack remotely by brute-force. Such an encoding might have overhead a bit high for normal deployment in the protector modifications to an application 12, but in connection with a protecting loader or interpreter, which must obtain their inputs by messaging or from an I/O device, would have negligible overhead.

The local machine executable or script is so encoded, and the protecting loader or interpreter is derived from the normal one by modifying it to take its machine executable or script input in this encoded form. Programs which produce machine executables and scripts may be correspondingly modified to write them in this encoded form where necessary.

Of course, all of the executables to be executed by protecting loaders and interpreters may be correspondingly modified to have the proper encoding so that they will work.

As a result, any added alien fragment cannot be correctly executed or interpreted, since it is incorrectly encoded for any executable code on the system on which it is added. If it occurs where machine code is expected, it is not proper machine code; if it occurs where script code is expected it is not proper script code. Hence, any actions written into any such fragment (say a virus) by a cracker cannot occur. The potentially hostile actions are foiled. If such a fragment is created, in an insider attack, with knowledge of a particular system's encoding for such purposes, it will not work on any other system due to the diversity of encodings used among systems. Indeed, if it is created with knowledge of the encoding used at a particular time, it probably will not work at another time on the same system, if the encodings are refreshed at random and sufficiently frequent intervals.

This kind of modifying capability may be installed in the protector 40 as an additional capability, since it need only identify the places in the code where the input or output occur, and apply the appropriate encoding on write or decoding on read. That is, the protector 40 may be extended to enable it to create protecting loaders and interpreters and associated machine executable and script writing programs, as well as to carry out its normal function of protecting applications 12 against buffer overflow attacks.

There are two defenses against potentially hostile alien programs by protecting loaders and protecting interpreters:

1. Refuse to execute them at all. In that case, the defense against alien code fragments described above already achieves it if the defense is installed as described above, with no extensions, alien programs will not execute since, from the protecting loader's or protecting interpreter's point of view, they are completely incomprehensible. If programs are to be imported over the Internet, they should then be imported carefully, with adequate checks on protections such as code signing, and then the current encoding for such executables should be applied so that they will work properly on the importing system; or
2. Execute them, but at a reduced level of privilege, or in a restricted environment (which is called a "sandbox"). In this case, the modifications made to loaders and interpreters must be slightly extended to provide an additional bit of functionality.

The extension, in case the alien programs are to be permitted to execute, but in a restricted fashion, will be described. In this case, the protecting loader or protecting interpreter attempts to deal with the program using the system's current encoding. If this succeeds, it is dealing with a non-alien program and proceeds normally.

However, if it fails, the extension is to try reading the program without decoding it. If this succeeds, the program is an alien program. In that case, the protecting loader or protecting interpreter proceeds normally, except for the way in which the code is executed. It is either executed in a sandbox or with reduced privileges, so that its restricted environment or its restricted privileges prevent it from harming the system into which it has been imported.

The ability to convert a loader or interpreter into a protecting loader or protecting interpreter with this kind of privilege- or environment-restricting form may be added to the protector 40. What the protector 40 does is to locate the initial input of the executable code (whether machine code or script code) and insert a check: does this look like an encoded executable or an unencoded one? This is then used to set a flag, not accessed by the remainder of the loader or interpreter code except as noted below, which indicates whether the executable was encoded (non-alien) or unencoded (alien). The protector 40 locates the point where the loader or interpreter would initiate execution of the executable code, and modifies the code so that, wherever this occurs, the first step is to ensure that the privilege level is reduced or the sandbox environment is established.

With this added capability, the protector 40 can ensure that, whether alien code is in the form of an alien code fragment or an alien program, the system 13 on which the code is executed is protected against hostile actions which the alien code might perform, whether by preventing any execution of such actions (for a fragment or a program whose execution is simply refused) or by reducing its capabilities using a sandbox or reduced privileges so that such hostile actions cannot be effective.

While particular embodiments of the present invention have been shown and described, it is clear that changes and modifications may be made to such embodiments without departing from the true scope and spirit of the invention.

The protection provided by the invention is relative, rather than absolute. The level of protection provided, varies with the sophistication of the encodings and the degree to which they are applied. When an appropriately strong level of protection is used, the invention is highly effective in protecting software from automated attack. It is understood that as computers and computer resources become more and more powerful, the degree to which the techniques of the invention must be applied to ensure effective protection, will also rise.

The method steps of the invention may be embodiment in sets of executable machine code stored in a variety of formats such as object code or source code. Such code is described generically herein as programming code, or a computer program for simplification. Clearly, the executable machine code may be integrated with the code of other programs, implemented as subroutines, by external program calls or by other techniques as known in the art.

The embodiments of the invention may be executed by a computer processor or similar device programmed in the manner of method steps, or may be executed by an electronic system which is provided with means for executing these steps. Similarly, an electronic memory means such computer diskettes, CD-Roms, Random Access Memory (RAM), Read Only Memory (ROM) or similar computer software storage media known in the art, may store code to execute such method steps. As well, electronic signals representing these method steps may also be transmitted via a communication network.

We claim:

1. A method of controlling a computer to protect a computer program executed by said computer from attacks by malicious software using buffer overflows, the method comprising:
   a) identifying an area in data memory associated with a buffer to which data, in the form of an incoming message, argument, or other communicated value, is written to, or read from, during execution of said computer program:
   b) encoding said data, even if said data overflows said buffer, using an encoding selected from a plurality of encodings, to result in encoded data; said plurality of encodings include a specific encoding comprising an addition of a byte constant K (mod 256) to each data byte being encoded, thus permitting decoding of each said data byte by adding a complementary constant;
   c) repeating steps a) and b) for each of a plurality of different areas of the data memory associated with different buffers to which data is written to, or read from, during execution of the computer program, such that data within adjacent buffers are encoded with different encodings selected from the plurality of encodings, and such that encoded data in adjacent buffers requires different decoding; and
   d) decoding data within each adjacent buffer based on the encoding used for each adjacent buffer such that said data which overflows said buffer into an adjacent buffer will not be properly decoded, to prevent buffer overflow from one buffer to an adjacent buffer to be used by the malicious software;
   wherein encodings used to encode data are mathematically simple and constants to be used in said encoding are selected based on a storage address of data to be encoded.

2. A method according to claim 1 whereby data is encoded prior to being stored in each said areas of memory.

3. A method according to claim 1 whereby areas of memory identified in step a) are identified based on a likelihood of whether an overflow from said area of memory is exploitable by said attacks.

4. A method according to claim 1 wherein the encoding selected is selected minimize execution overhead.

5. A method according to claim 1 whereby said plurality of encodings are implemented using in-line, non-branching, non-conditional (straight-line) code.

6. A method according to claim 1 wherein the encoding selected keeps a size and address of the data memory from which it reads or writes data unchanged.

7. A method according to claim 1 whereby at least one of said plurality of encodings comprises an exclusive OR(XOR) operation with a non-zero byte constant.

8. A method according to claim 1 whereby at least one of plurality of encodings comprises performing an exclusive OR(XOR) operation between a data byte and a low order eight bits of a memory byte associate with said data byte.

9. A method according to claim 1 whereby said constants comprise four byte constants, said constants being applied to byte elements of an encoded array such that each byte element of said encoded array is assigned one of said four byte constants, an assignment of byte constants being determined by a value of a low-order two-bit address field of each piece of byte data to be stored or fetched in said array.

10. A method according to claim 1 whereby said constants comprise sixteen byte constants, said constants being applied to byte elements of an encoded array such that each byte element of said encoded array is assigned one of said sixteen byte constants, an assignment of byte constants being determined by a value of a low-order four-bit address field of each piece of byte data to be stored or fetched in said array.

11. A method according to claim 3 wherein step (a) comprises identifying an input buffer used to receive character sequences from external sources as said area of memory associated with a buffer.

12. A method according to claim 3 wherein step (a) comprises identifying a buffer used to provide input passed from the computer program to a operating system in which said computer program runs as said area of memory associated with a buffer.

13. A method according to claim 1 whereby said specific encoding further comprises applying an exclusive OR (XOR) based encoding to each byte subsequent to said addition of a byte constant K(mod 256) to each data byte being encoded.

14. A method according to claim 13 whereby said exclusive OR based encoding comprises performing an exclusive OR operation between a low-order byte of an address associate with said data byte to be encoded and said data byte.

* * * * *